United States Patent [19]

Black et al.

[11] Patent Number: 4,878,204

[45] Date of Patent: Oct. 31, 1989

[54] METHOD FOR TRUE-AMPLITUDE DIP MOVEOUT CORRECTION

[75] Inventors: James L. Black; Cameron B. Wason, both of Plano, Tex.

[73] Assignee: Geophysical Service, Inc., Dallas, Tex.

[21] Appl. No.: 264,090

[22] Filed: Oct. 28, 1988

[51] Int. Cl.$^4$ ............................................. G01V 1/36
[52] U.S. Cl. ...................................... 367/53; 367/52; 364/421
[58] Field of Search ...................... 367/47, 50, 51, 52, 367/53; 364/421

[56] References Cited

U.S. PATENT DOCUMENTS 4,742,497  5/1988  Beasley et al. ...................... 367/52
4,797,861  1/1989  Beasley ............................... 367/50

OTHER PUBLICATIONS

Hale, "Dip–Moveout by Fourier Transform", Doctoral Thesis, Stanford University, 1983, pp. 67–71.
Deregowski & Rocca, "Geometrical Optics and Wave Theory of Constant Offset Sections in Layered Media", Geophysical Prospecting 29, pp. 374–406 (1981).
Berg, "Application of Dip–Moveout by Fourier Transform Method Overview and Presentation of Processed Data from 2-D and 3-D Surveys", 54th Annual Meeting SEG, Atlanta, Expanded Abstracts, pp. 496–799 (1984).
Hale, "Dip–Moveout by Fourier Transform", Geophysics 49, pp. 741–757 (1984).
Jorden, Bleistein and Cohen, "A Wave Equation–Based Dip Moveout", 57th Annual Meeting SEG, New Orleans, Expanded Abstracts 718–721 (1987).
Jorden, "Transformation to Zero Offset", Doctoral Thesis, Colorado School of Mines (1987).
Berg, "Pre-Stack Partial Migration", 54th Annual Meeting SET, Atlanta (1984), Reprint by Geophysical Co. of Norway A.S.

Primary Examiner—Thomas H. Tarcza
Assistant Examiner—Ian J. Lobo
Attorney, Agent, or Firm—Arnold, White & Durkee

[57] ABSTRACT

A method for carrying out dip moveout correction on seismic data which provides true-amplitude seismic images is provided. A calibration process is used to design a set of filters that correct the seismic amplitudes during dip moveout correction so as to provide true-amplitude imaging. These filtrs can be designed and applied in any known implementation of dip-moveout, in three or two dimensions.

3 Claims, 5 Drawing Sheets

METHOD FOR TRUE-AMPLITUDE DIP MOVEOUT CORRECTION

BACKGROUND OF THE INVENTION

This invention deals with an improved method of three-dimensional seismic imaging which preserves seismic amplitudes, so that the amplitudes on the final seismic image are proportional to the reflectivity of the earth, regardless of the geologic dip, depth of burial, or seismic recording geometry. The technique is easily specialized to two-dimensional DMO, in the case where the shot-receiver axis lies along the direction of survey.

Common-depth-point stacking ("CDP", also known as common-mid-point or common-reflection-point stacking), in which seismic traces from the same surface midpoint but from different shot profiles and having different offset distances are summed to attenuate unwanted signals, is well known in the art. When the subsurface reflector is horizontal, "flat", the established techniques of spherical divergence correction, normal moveout ("NMO") and zero-offset 3D migration produce an accurate 3D seismic image after CDP stacking.

In most practical situations the reflector of interest is not flat. For a dipping reflector an extra step, dip moveout ("DMO"), must be added in order to prevent CDP stacking from attenuating the image of the reflector. The purpose of DMO is to correct finite-offset seismic data to an equivalent zero-offset data set.

There are various alternative equivalent implementations of DMO. Perhaps the most popular are Hale's method and the summation method of Deregowski and Rocca. Hale's Fourier-based method, proposed in his doctoral thesis "Dip Moveout by Fourier Transform" submitted to Stanford University Geophysics Department, May 1983, is carried out in frequency/wave vector (f,k) domain. Deregowski and Rocca's summation method described in "Geometrical Optics and Wave Theory of Constant Offset Sections in Layered Media," Geophysical Prospecting 29, 374–406 (1981), is carried out in time/space (t,x) domain. It involves summation along a "DMO trajectory."

The original work of Deregowski and Rocca was concerned primarily with two-dimensional DMO, in which the line connecting the shot and receiver is co-linear with the direction of the seismic survey line. Hale generalized DMO to the three-dimensional situation, in which the shot-receiver axis can lie in any direction relative to the survey direction. Berg, in "Application of Dip-Moveout by Fourier Transform: Method Overview and Presentation of Processed Data from 2-D and 3-D Surveys," 54th Annual Meeting of the SEG, Atlanta, Expanded Abstracts, 796–799, (1984), showed how to connect Hale's technique with Deregowski and Rocca's summation method. U.S. Pat. No. 4,742,497 to Beasley et al exploited this connection to describe a three-dimensional version of the technique of Deregowski and Rocca. Hale's work had shown that the DMO operation should always be performed along the shot-receiver axis. Beasley et al simply took the summation algorithm of Deregowski and Rocca and executed it along the shot-receiver axis.

It is necessary to do more than simply map each input amplitude along the DMO trajectory, if a true amplitude DMO process is to be achieved. True-amplitude DMO not only puts every event at the correct zero-offset position, but also guarantees that the each event's amplitude is what would have been recorded at zero offset. Kinematic DMO, such as the techniques referred to above, puts each event at the correct space and time position but fails to produce the correct amplitudes. Deregowski and Rocca introduced the notion of convolving the data with a time-variant filter S as part of the mapping process. The key to turning kinematic DMO into true-amplitude DMO is the correct design and application of the filter S.

There have been several prior attempts to turn DMO into a "true-amplitude" process. Deregowski and Rocca experimented with various ad hoc filters S to be applied as part of their summation method but never came up with a satisfactory solution. In his PhD thesis, Hale unsuccessfully attempted to derive the set of filters in (f,k) space. However, he abandoned these filters in his later published work, "Dip-Moveout by Fourier Transform" Geophysics, 49, 741–757 (1984), and went with unsatisfactory heuristically-derived filters instead. Berg (1985) showed how to transform Hale's heuristic filters into a summation technique similar to Deregowski and Rocca's method, but the results were no better than Hale's.

Recently, Jorden, Bleistein, and Cohen, "A Wave Equation-Based Dip Moveout," 57th Annual Meeting SEG, New Orleans, Expanded Abstracts 718–721 (1987), attempted to connect DMO with the wave equation. They outlined a method for making this connection based upon the Born approximation, but published no details of what kind of DMO filters would result from their analysis. In his doctoral thesis, "Transformation to Zero Offset" submitted to Colorado School of Mines, April, 1987, Jorden outlines a proposal for a seismic imaging algorithm which is related to DMO but is not the same as DMO. His algorithm is applied in the absence of separate spherical divergence and NMO corrections. The concept of using a summation approach with filters is employed, following the approach of Deregowski and Rocca. In addition, the mathematical expressions for the filters are so extremely complicated as to render the algorithm impractical for use in actual surveys. Also, the algorithm is not fully three-dimensional.

SUMMARY OF THE INVENTION

This invention provides a practical method for transforming a set of a really-distributed seismic field traces into an image whose amplitudes are directly proportional to the earth's reflectivity.

An improved DMO process is provided which consists of a calibration method for designing a set of filters that correct the seismic amplitudes so as to preserve true-amplitude imaging. These filters can be designed and applied in any known implementation of DMO. The filters can be applied in three-dimensional DMO or specialized to two-dimensional DMO. Special particularly convenient forms of the filters result when the spatial sampling of the input traces is reasonably uniform.

The modified DMO process produces output traces in designated output-cell locations. The output traces in all cells may be displayed as a zero-offset three-dimensional unmigrated image of the earth. Application of a subsequent 3D zero-offset migration yields traces which may be displayed as a three-dimensional image proportional to the reflectivity of the earth.

DETAILED DESCRIPTION OF THE PREFERRED METHOD OF THIS INVENTION

The following notation is employed through the following description. Boldface quantities (e.g. y) indicate two-dimensional vectors along the earth's surface.

| | |
|---|---|
| $P(\mathbf{y},t_h)$ | deconvolved seismic trace data. |
| $P_s(\mathbf{y},t_h)$ | seismic trace data after spherical divergence correction. |
| $P_h(\mathbf{y},\bar{t}_o)$ | seismic trace data after NMO correction. |
| $P_O(\mathbf{x}_i,t)$ | seismic trace data after DMO correction. |
| $M(t_m,\mathbf{x})$ | final seismic trace after imigration. |
| $t_h$ | trace time prior to NMO correction. |
| $t_o$ | NMO-corrected trace time (input time to DMO). |
| $t$ | zero-offset trace time (output time from DMO). |
| $t_m$ | imigrated trace time. |
| $\mathbf{r}$ | trace receiver coordinate. |
| $\mathbf{s}$ | trace source coordinate. |
| $\mathbf{y}$ | trace midpoint coordinate. |
| $\mathbf{x}_i$ | zero-offset coordinate of $i^{th}$ DMO output trace. |
| $d_i$ | distance between $\mathbf{y}$ and $\mathbf{x}_i = |\mathbf{y} - \mathbf{x}_i|$. |
| $\mathbf{h}$ | half of the shot-receiver offset $= (\mathbf{s} - \mathbf{r})/2$. |
| $h$ | magnitude of the vector $\mathbf{h}$. |
| $A_i$ | the kinematic moveout factor relating $t$ to $\bar{t}_o$ by $t = t_O/A_i$ and given by $A_i = [1 - (d_i/h)^2]^{-\frac{1}{2}}$ |
| $S(d_i,t,t')$ | a time-variant filter applied during DMO to ensure the method preserves amplitudes. |
| $\omega$ | Fourier frequency variable, conjugate to zero-offset trace time. |
| $w(t_h)$ | deconvolved source wavelet. |
| $\phi$ | dip angle. |
| $y'$ | a dummy summation variable employed in the definition of the filter $G(d_i,t,t')$. The summation range of $y'$ is the same as that of $y$. |
| $\sigma$ | the distance between $y'$ and $x_i$. |
| $D'$ | the dip that is tangent to the DMO trajectory at distance $d_i$ from point $x_i$. |

Figure 1:
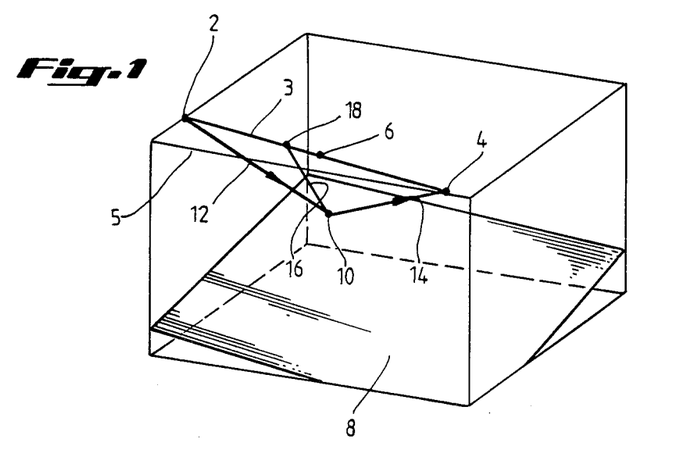
FIG. 1: An isometric view of the earth with a dipping reflector, showing the relationship between the raypaths for a finite-offset source-receiver air and a zero-offset source-receiver pair reflecting from the same point.

Referring to FIG. 1, a plan view of a 3D seismic survey is shown. The seismic energy emanates from source 2 and is received at receiver 4. The trace recorded for this source and receiver is conventionally displayed at the source-receiver midpoint position 6, whose Cartesian coordinate vector is denoted by y. The energy bounces off the reflector 8 at the reflection point 10, with raypath 12 from source 2 to reflection point 10 and raypath 14 from reflection point 10 to receiver 4. The purpose of three-dimensional (3D) DMO is to create an equivalent trace corresponding to the zero-offset raypath 16 and to position that trace at surface location 18, whose Cartesian coordinate is denoted by $\mathbf{x}_i$.

Figure 2:
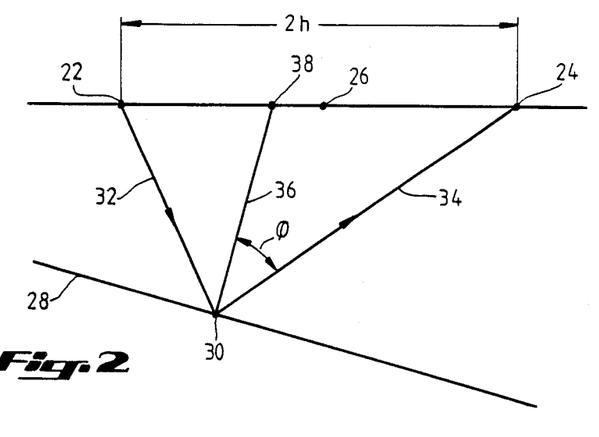
FIG. 2: A section view in the plane containing the source, receiver, and reflection point from FIG. 1.

FIG. 2 is a section view of raypaths for a dipping reflector displayed in the plane containing the source 22, receiver 24 and reflection point 30. The source-receiver offset, the distance between source 22 and receiver 24, has the value 2h.

Figure 3:
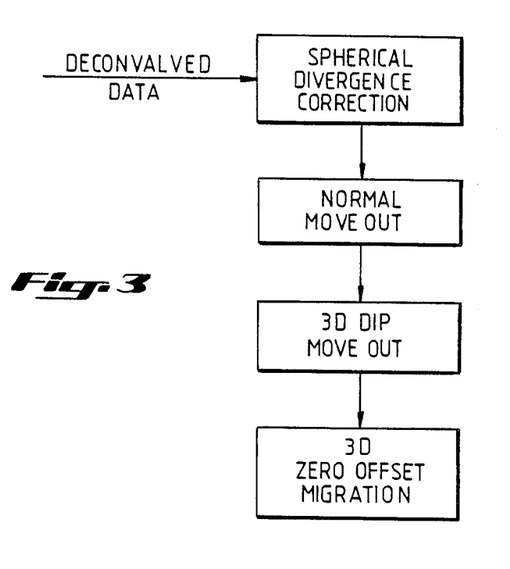
FIG. 3: A flow diagram of the amplitude-preserving seismic imaging system of the present invention.

FIG. 3 shows a processing sequence for producing a true-amplitude image of any reflector, such as the one illustrated in FIGS. 1 and 2. The input data has been previously deconvolved to produce a wavelet of approximately constant spectral amplitude over a bandwidth range. This step, which does not form part of the present invention, can be performed by any of a number of standard techniques, with which those skilled in the art are familiar. The imaging sequence, shown in FIG. 3, is spherical-divergence correction, normal-moveout (NMO) correction, 3D DMO, and 3D zero-offset migration. It is generally understood that the data corresponding to different offsets is stacked together at some stage after the NMO has been performed to improve the signal to noise ratio. The spherical-divergence correction in simplest form consists of multiplying each deconvolved trace $P(\mathbf{y},t_h)$ by $t_h$, to yield $P_s(\mathbf{y},t_h)$ but the present invention is not limited to this particular form of correction. The NMO correction consists of mapping $P_s(\mathbf{y},t_h)$ to post-NMO time $\bar{t}_0$ by the well-known relationship:

$$P_h(\mathbf{y},\bar{t}_0) = P_s(\mathbf{y},t_h) | t^2_h = \bar{t}^2_0 + 4h_2/v^2 \quad (1)$$

where v is the rms velocity. The migration can be done by any of a number of well-known standard techniques.

DMO can be equivalently applied to input traces arranged into various sets: common-offset sections, common-shot records, and single-trace sets. For 3D implementations, it is often more convenient to not apply DMO to common-offset sections or common-shot records, but to process each individual input trace in essentially whatever order it appears on the magnetic tape. The improved method of DMO described here can be applied to any of these input-trace organizations.

Some DMO implementations produce data in which all offsets have been summed together, producing a stack section ready to go immediately into the zero-offset migration algorithm. Other DMO implementations produce output traces which are arranged into various sets, to be stacked together after some subsequent processing. In particular, it is useful to keep the DMO outputs separated according to their offsets, so as to allow a velocity analysis after DMO has been applied to the data. After this velocity analysis has been performed, the traces can be corrected for residual NMO errors (occurring in the NMO step that preceded DMO) prior to being stacked and migrated. The improved DMO algorithm presented here can be used to produce output traces which are offset-separated or which are already stacked over offset.

Figure 4:
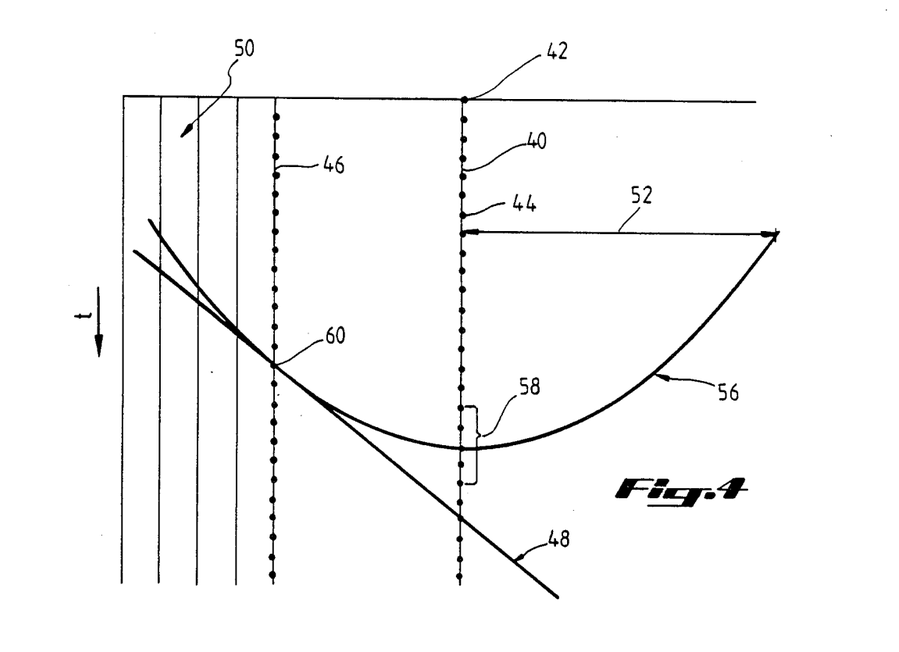
FIG. 4: A time section corresponding to FIG. 2, showing how the amplitudes on an input trace are filtered and mapped to produce an output trace in the summation method of DMO.

FIG. 4 shows how the Deregowski and Rocca summation method of DMO is carried out. The input seismic trace is shown schematically as the vertical line 40, which is positioned at the source-receiver midpoint position 42, whose Cartesian coordinate is y. The individual digitally-recorded amplitudes on the seismic trace are at the discrete time positions indicated by the solid dots, such as 44. The DMO process generates a plurality of output traces, such as 46 and 50. This is in keeping with the fact that the DMO process makes no assumption about the angle of dip of the seismic data which governs the location of the zero-offset output trace and therefore must allow each input trace to contribute to a number of output traces within a DMO aperture distance 52. This aperture is generally determined by the maximum physically-allowable dip.

The Deregowski and Rocca summation method of DMO consists of convolving a time-variant filter with the input trace 40 and then mapping the resultant amplitude along the DMO trajectory 56. Derivation of a suitable DMO trajectory is taught by Deregowski and Rocca in the publication referenced above, and is familiar to those skilled in the art. The present invention provides an improved time variant filter, which is hereinafter described. For example the set of points 58 is multiplied with the elements of the filter, and the sum of these products is mapped to the time sample 60 on the output trace 46. This process is repeated for every other output trace, such as 50, within the DMO aperture distance 52 on either side of the midpoint 42. As in any convolution, the elements of the time-variant filter are then applied to a new set of points displaced one time sample deeper than points 58, and the entire process is repeated until all time samples on the input trace 40 have been exhausted. The process is then repeated for the next input trace, and its contributions are summed into the output traces such as 46 and 50. This summation process will lead to constructive and destructive interference. An event with arbitrary dip present in the input data will destructively interfere with itself except at one particular output location 60, which is where the DMO trajectory 56 is tangent to the zero-offset travel time curve 48 for the dipping event.

Thus, when all input traces have been exhausted, the summed results in the output traces are the DMO output product, representative of a zero-offset dataset.

Written out as a summation, the method described above builds the output traces $P_0(x_i,t)$ from the input traces $P_h(y,\bar{t}_0)$ by the following summation:

$$P_0(x_i, t) = \sum_{t'} \sum_{y} P_h(y,tA_i - t')S(d_i,t,t') \qquad (2)$$

Where $d_i = |y - x_i|$ and $A_i = [1 - (d_i/h)^2]^{-\frac{1}{2}}$.

Figure 5:
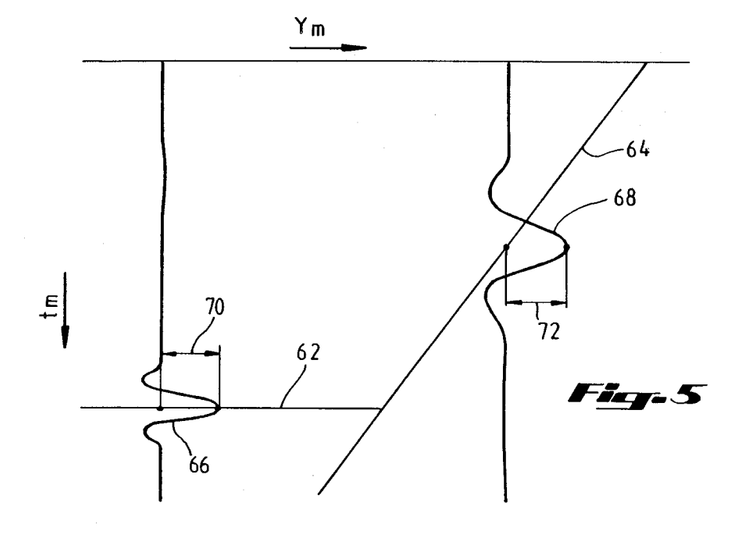
FIGS. 5, 5A and 5B: Illustration of a convention by which the amplitude of a seismic image is related to the earth's reflectivity.
Figure 5A:
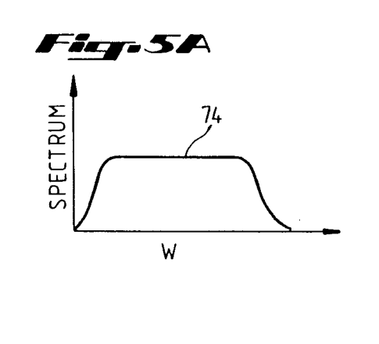
Figure 5B:
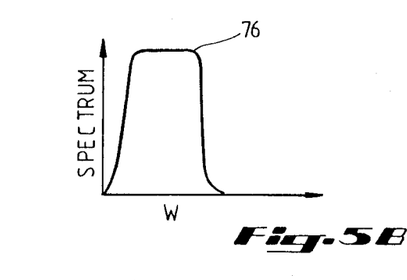

The current invention provides a method of designing the filters $S(d_i,t,t')$ to ensure that $P_0(x_i,t)$ is a true-amplitude representation of the earth's reflectivity. First, a satisfactory definition of the term "true-amplitude" is required. This invention is applicable to several definitions of true-amplitude. FIG. 5 demonstrates one such definition. A flat event 62 and a dipping event 64 are assumed to have the same reflection coefficient. The final migrated image of the flat event is the seismic trace 66, while the final migrated image of the dipping event is the seismic trace 68. This definition of "true-amplitude" requires that any two isolated events with the same reflection coefficient have the same peak amplitude on the migrated image. Thus, the peak amplitudes 70 and 72 are shown to be the same in FIG. 5. Note, however that the Fourier spectrum 74 of the seismic trace 66 for the flat event shown in FIG. 5A has a broader bandwidth than the Fourier spectrum 76 of the seismic trace 68 for the dipping event shown in FIG. 5B. This is consistent with the shorter wavelet 66 of the flat event in comparison with the dipping event 68. This change in bandwidth is why care must be taken in defining what is meant by "true-amplitude."

Figures 6A, 6B:
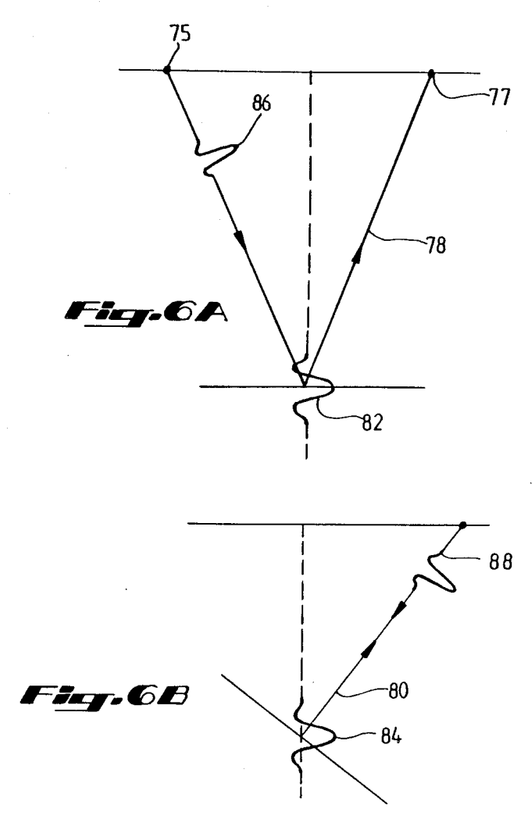
FIGS. 6A and 6B: A raypath diagram illustrating the effect of reflection obliquity on the bandwidth of the final wavelet in the seismic image.

The bandwidth changes in FIG. 5 are an unavoidable result of the obliquity of raypaths, illustrated in FIG. 6A. Anytime the raypaths deviate from the vertical direction, either due tooffset between source 75 and receiver 77 in the case of raypath 78 shown in FIG. 6A, or due to dip in the case of the zero-offset raypath 80 shown in FIG. 6B, the achievable vertical bandwidth, as defined by the wavelets 82 and 84, is lower than the bandwidth on the source wavelets 86 and 88. This unavoidable bandwidth reduction makes it necessary to define "true-amplitude" in some fashion which is independent of the bandwidth of the final wavelet. The "constant peak amplitude" definition described above is one possible definition. A "constant Fourier spectral amplitude" definition would also be possible. In the preferred implementation of true-amplitude DMO, the "constant peak amplitude" definition of FIG. 5 will be used, although the changes for "constant Fourier spectral amplitude" are readily derivable and amount to multiplying the NMO, DMO and zero-offset migration outputs by the obliquity factors of $\bar{t}_0/t_h$, $A_i$ and $\cos\theta$, respectively.

Figure 7:
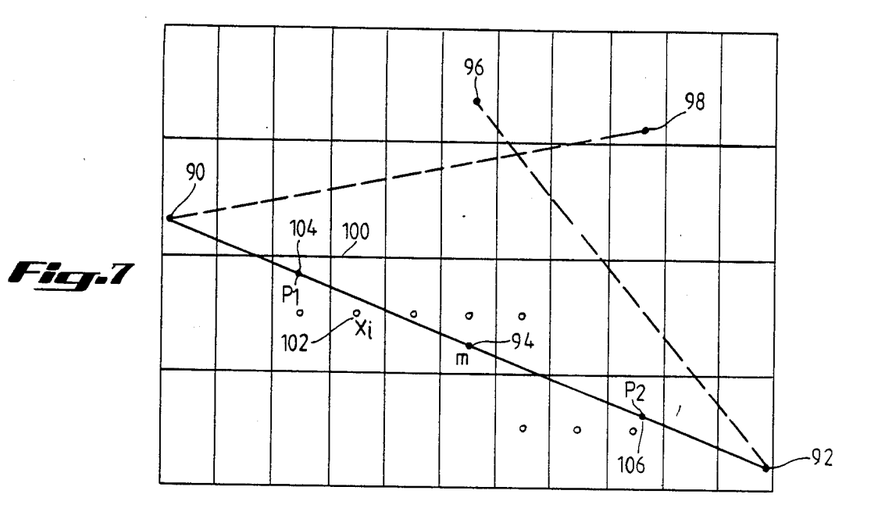
FIG. 7: Plan view of a 3D seismic survey, showing the relationship between the recording geometry of FIG. 1 and the output cells into which DMO puts traces.

FIG. 7 is a plan view of a 3D seismic survey, showing the relationship between the source/receiver geometry of FIG. 1 and the output cells in which 3D DMO will create output traces. The shot 90 and receiver 92 are connected by a line segment whose center is at the midpoint 94. In the same survey, there will generally be other source locations such as 96 and other receiver locations such as 98. The area of the survey is to be conceptually divided into a set of geometrical figures such as the rectangle 100. Each such figure is assigned a reference point (usually the centroid of the figure) such as the center of the rectangle 102, whose Cartesian coordinate is $x_i$. The DMO aperture for any given output time t is defined by half the segment connecting the two points 104 and 106, which are located vertically above the ends of the DMO trajectory and are symmetrically placed about the midpoint 94.

There are both "input-driven" and "output-driven" implementations of true-amplitude DMO. The output-driven implementation follows Equation (2) by summing over all input traces y which are within a DMO aperture of fixed output location $x_i$. Once the sum defining the trace at $x_i$ is completed, the algorithm moves on to the next output trace at a new location for $x_i$. The input-driven method proceeds by taking each input trace and allowing it to contribute to all possible $x_i$ within a DMO aperture of it. Once it has contributed to all possible output traces, the next input trace (at a new location y) is brought in and summed into all its $x_i$ locations. The modified filters of this invention may, of course, be used in either implementation, but details will be given here only for the output-driven method.

Figure 8:
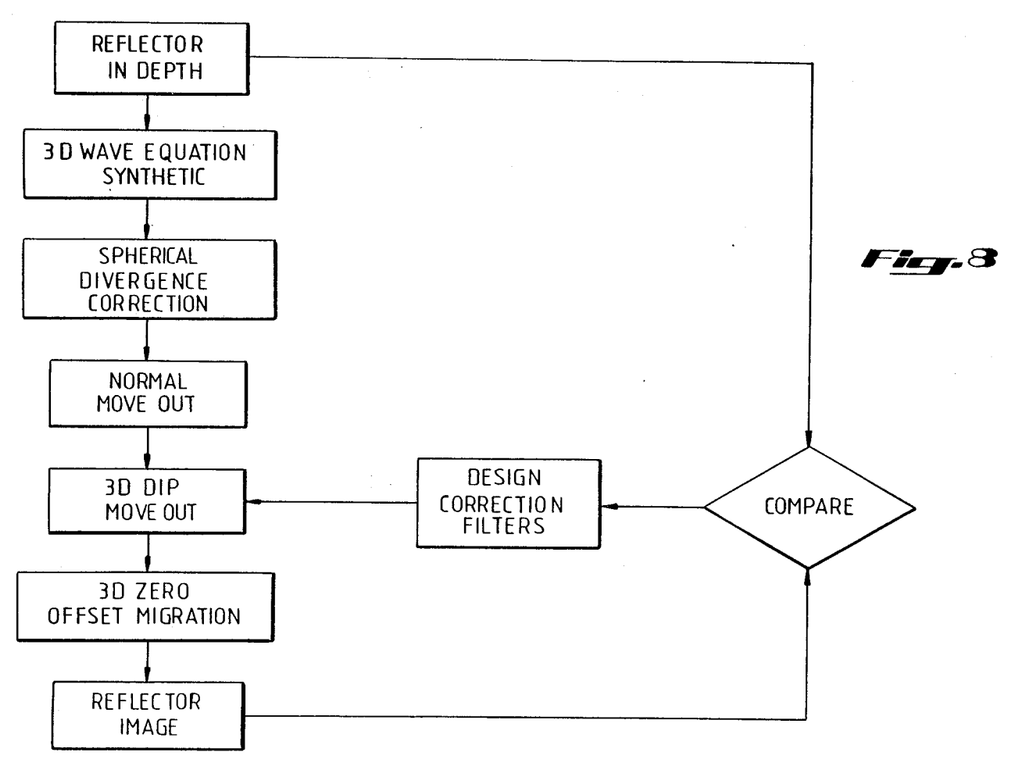
FIG. 8: Flow diagram of the process for obtaining the correction filters of the present invention.

The key to this invention is a calibration procedure for designing the set of DMO correction filters, S. This procedure is shown schematically in FIG. 8. The procedure begins with a three-dimensional dipping layer such as 8 in FIG. 1. This layer has a known arbitrary dip and a known reflectivity $R(\phi)$, where is the reflection angle as shown in FIG. 2. The three-dimensional scalar wave equation is used to generate the synthetic dataset $P(y,t_y)$ corresponding to a known deconvolved source wavelet $w(t_h)$. The calibration procedure then consists of analytically processing $P(y,t_h)$ through spherical divergence correction, NMO, DMO and zero-offset migration, as shown in FIG. 8. All of the processes except the DMO are done in the standard manner. The DMO is done with an extra degree of freedom, in the form of a set of correction filters S. These filters are then calibrated to ensure that the final migrated output of the processing has an amplitude proportional to the reflectivity $R(\phi)$, regardless of the dip of the event, the depth of the event, or the recording geometry.

This calibration process is carried out as follows. From the 3-D wave equation, the seismic data collected over a dipping planar reflector is given by $$P(y,t_y) = R(\phi) \frac{w(t_h - \tau)}{r} \quad (3)$$

where the distance $r(h,y) = v\tau(h,y)$ is the sum of the distances 12 and 14 in FIG. 1, and $w(t_h)$ is the deconvolved source wavelet.

$\tau(h,y)$ is related to $\tau_0(y)$, the zero-offset two-way travel time along raypath 16, in FIG. 1, by the following equation:

$$\tau^2(h,y) = \tau^2{}_0(y) + 4h^2/v^2 - (h\,D)^2 \quad (4)$$

where D is the dip vector defining the slope of the planar dipping reflector 8:

$$\tau_0(y) = \tau_0(0) + D\,y \quad (5)$$

The dip vector D is related to the depth of the reflector $z(x)$ via $$z(x) = v\tau_m(x)/2 \quad (6)$$

where $$\tau_m(x) = \frac{\tau_o(x)}{\cos\phi}$$

and $$\cos\phi = \left[1 - \left(\frac{D\,v^2}{2}\right)^2\right]^{\frac{1}{2}}$$

with $D = |D|$.

After processing $P(y,t_h)$ through the standard spherical-divergence and NMO corrections shown in FIG. 8, the calibrating dataset takes the form:

$$P_h(y,\bar{t}_o) = R(\phi)\,w[\lambda_n(\bar{t}_o - \tau_n(y))] \quad (7)$$

where $$\tau^2{}_n(y) = \tau^2{}_n(y) - (h\,D)^2$$

and $$\lambda_n = \frac{t_o}{t_h}$$

The synthetic data is then processed using a known kinematic form of the 3-D DMO operation, with filters represented by an extra degree of freedom. For example, if the Deregowski and Rocca method is used, the summation in Equation (2) is carried out.

The expression for the Fourier transformed $P_o(x_i,\omega)$ can be written in terms of the summation G:

$$P_o(x_i,\omega) = R(\phi)\,e^{-i\omega\tau_0(xi)}\frac{1}{\lambda_n A_i}\left[W\left(\frac{\omega}{\lambda_n A_i}\right)\right]S(\omega)\,G(\omega) \quad (8)$$

with $$G(\omega) = \sum_y e^{-i\omega(\tau_n/A_i - \tau_o)} \quad (9)$$

where $W(\omega)$ is the Fourier transform of the system wavelet $w(t_h)$. It has been found that $G(\omega)$ can be written totally as a function of the midpoint variables y and $x_i$ in Equation (2), thus eliminating any explicit dependence on dip.

The final step in the calibration processing is to appy 3-D zero-offset wave equation migration to the dataset $P_o$ that was derived above to obtain the migrated image:

$$M(t_m,x) = R(\phi)\,w[(\lambda_n A_i \cos\phi)\,[t_m - \tau_m(x)]] * (S * G) \quad (10)$$

M is now compared against the desired band-limited image described in FIG. 5. This calibration will determine the DMO correction filters, S. To evaluate S, it is necessary to find the value of the image M at the peak of the image wavelet. This means evaluating $M(t_m,x)$ at $t_m = \tau_m(x)$:

$$M_{peak} = R(\phi)\,w(0) * (S * G) \quad (11)$$

Applying the true-amplitude imaging condition that events with the same reflectivity shall have the same peak amplitude in the image implies that S must be the inverse of G:

$$S = G^{-1} \quad (12)$$

which means that $$M_{peak} - R(\phi)\,w(0) \quad (13)$$

with $w(0)$ being a global proportionality constant.

Figure 9:
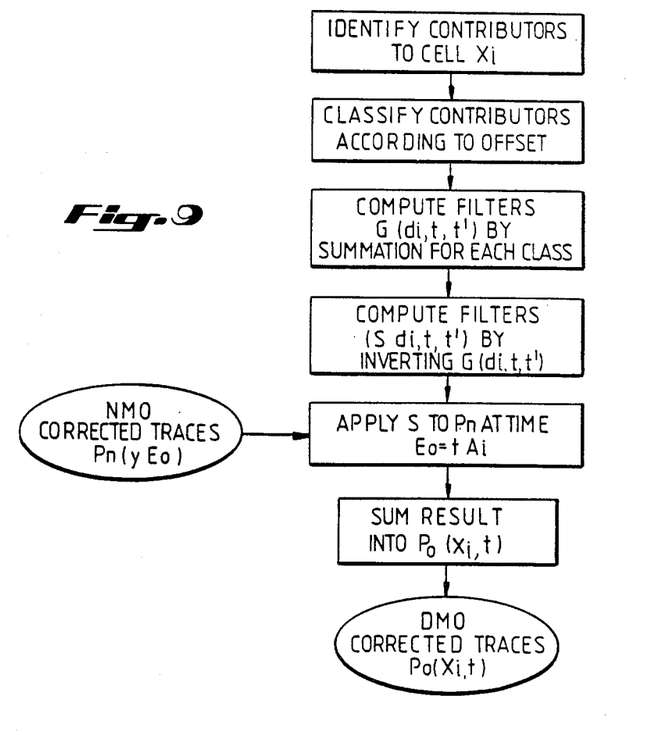
FIG. 9: Flow diagram of an implementation of the DMO process described in this invention.

The summation implementation of the true-amplitude DMO process of the present invention works according to the flow diagram of FIG. 9. The steps are:

1. Identify the set of traces y which contribute to the output location $x_i$. As shown in FIG. 7, an input trace with midpoint at 94 contributes if the line connecting its source 90 and receiver 92 passes through the figure with reference point $x_i$ (102) and if $d_i$ is less than the DMO aperture. The DMO aperture, $d_m(t)$, is a t-dependent quantity which is related to the maximum allowed dip $D_m$ by the formula:

$$d_m(t) = D_m h^2 / [t^2{}_n + (D_m h)^2]^{\frac{1}{2}} \quad (14)$$

where $$t_n = [t^2/2 + (t/2)\,[t^2 + 4(D_m h)^2]^{\frac{1}{2}}]^{\frac{1}{2}} \quad (15)$$

2. Classify all contributors to the cell at $x_i$ according to their offset ($= 2h$). A separate filter computation will be done for each offset class.

3. Compute the filters $G(d_i,t,t')$ for each offset class h by summing over all contributors in that class. In practice, G varies slowly with time, so it need only be computed at widely spaced "time gates" and linear interpolation used between computed values. It is convenient to express G in terms of its Fourier transform (or Discrete Fourier Transform) conjugate to the $t'$ direction as $$G(d_i,t,\omega) = \sum_{y'} e^{-i\omega(\tau_n/A_i - t)} \quad (16)$$

where $\tau_n^2 = (t + D'\sigma)^2 - (hD')^2$ $$D' = \frac{td_iA_i^2}{h^2}$$

$$\sigma = \begin{cases} |y' - x_i| & \text{if } (y' - x_i) h > 0 \\ -|y' - x_i| & \text{if } (y' - x_i) h < 0 \end{cases}$$

$A_i = [1 - (d_i/h)^2]^{-\frac{1}{2}}$ and the Fourier sign convention for Equation (16) is given by $$G(d_i,t,\omega) = \sum_{y'} e^{-i\omega t'} G(d_i,t,t').$$

Because of its symmetry, G need be computed only for positive values of $(y-x_i)$ h.

4. Invert the filter G to give the filter S. This can be done by any of a standard number of filter-inversion techniques. For example, a very simple procedure is to take S as the reciprocal of G:

$$S(d_i,t,\omega) = [G(d_i,t,\omega)]^{-1} \quad (17)$$

Then $S(d_i,t,t')$ can be obtained from $S(d_i,t,\omega)$ by inverse Fourier transform from $\omega$ to $t'$.

In practice, when the collection geometry is regular, the summation G does not depend strongly on the output location $x_i$. In this situation, the same set of filters S may be used over a broad range of output locations $x_i$.

5. Read the traces that contribute to $x_i$. For each t on the output trace, apply the filter S appropriate for the offset class to the input data $P_h(y,\bar{t}_0)$ at the mapped time position $\bar{t}_0 = tA_i$ and sum over all y as in Equation (2). Repeat for all t on the output trace, then repeat for each $x_i$. The procedure is then repeated for all offset classes.

The calibration procedure of this invention leads to true-amplitude DMO filters that can also be applied in DMO implementations other than the summation approach. In another embodiment the filters can be applied in Hale's F-K DMO algorithm:

$P_o(x_i,t)$ = Inverse spatial and temporal Fourier transform of $P_o(k,\omega)$ $$P_o(k,\omega) = \int d\bar{t}_o \, S_H \, e^{i\omega \bar{t}} \, \omega^A P_h(k,\bar{t}_o) \quad (18)$$

with $P_h(k,\bar{t}_o)$ = Spatial Fourier transform of $P_h(y,\bar{t}_o)$ from midpoint y to its conjugate variable, the wavevector k.

Hale's technique employs a set of non-true-amplitude filters $S_H$. The procedure for providing a true-amplitude version of Hale's procedure is to replace these filters $S_H$ by values which are derived from the true-amplitude filters, S, constructed by the calibration procedure. The generic connection between F-K DMO filters and summation DMO filters is a stationary-phase integral evaluation. The correct values of $S_H$ are $$S_H = S\mu \quad (19)$$

-continued where $\mu = h\left[\frac{2\pi}{-i\omega t}\right]^{\frac{1}{2}A-3}$ and $$A = \left[1 + \frac{(k\,h)^2}{(\omega t_o)^2}\right]^{\frac{1}{2}}$$

where S is the inverse of G given in Equation (16) above. To make $S_H$ a function of F-K domain variables rather than the x-t domain variables of S, every occurrence of $A_i$ in S must be replaced by the quantity A, and every occurrence of $d_i$ in S must be replaced by $$d_i = h[1-A^{-2}]^{\frac{1}{2}} \quad (20)$$

Use of this true-amplitude $S_H$ in Hale's F/K method yields substantially the same results as use of S in the summation method of Equation (2).

In the preferred embodiment, these processing steps are carried out using a programmed digital computer. Standard programs to carry out the operations involved in each step are well known to those in this field.

It is an advantage of this invention that its use provides a true-amplitude seismic image when it is applied to known methods of performing 3-D DMO. It is a further advantage of this invention is that it provides a true-amplitude 3-D DMO method which is computationally practical and which can readily be used in seismic surveys.

Additional advantages and modifications will be readily apparent to those skilled in the art. The invention in its broader aspects is therefore not limited to the specific details or the illustrative example shown an described. Accordingly, departures may be made from the detail without departuring from the spirit or scope of the disclosed general inventive concept.

We claim:

1. A method for carrying out true-amplitude dip moveout on seismic data which comprises:
   selecting a reflectivity and dip for a theoretical dipping layer in three dimensions;
   generating a synthetic dataset corresponding to reflection from the theoretical dipping layer using a known deconvolved source wavelet and a conventional three dimensional scalar wave equation;
   correcting the synthetic dataset for spherical divergence to provide a spherical divergence corrected synthetic dataset;
   correcting the spherical divergence corrected synthetic dataset for normal moveout to provide a normal moveout corrected synthetic dataset;
   correcting the normal moveout corrected synthetic dataset for dip moveout using an extra degree of freedom in the dip moveout equation to provide a corrected synthetic dataset;
   performing zero-offset migration on the corrected synthetic dataset to provide a migrated seismic image;
   comparing the migrated seismic image with a known true-amplitude image derived from the known reflectivity and the known source wavelet from the theoretical dipping layer;
   adjusting the migrated seismic image to substantially correspond to the known true-amplitude image by adjustment of the extra degree of freedom to provide a set of correction filters;

applying the correction filters during dip moveout correction operations on data from seismic surveys.

2. A method for carrying out true-amplitude dip moveout on seismic traces generated in a survey area by seismic receivers after activation of seismic energy sources, which comprises:

dividing the survey area into a set of geometrical figures which function as output cells;

assigning a reference point to each of the output cells;

calculating a dip moveout aperture as a time dependent function related to a maximum allowable dip;

for each output cell, identifying the contributing seismic traces which are those seismic traces which meet the conditions that the line connecting the generating receiver and the activating source of that trace intersects the output cell and that the distance between the midpoint of that line and the reference point of the cell is less than the dip moveout aperture;

classifying all contributing seismic traces according to their offset;

computing a DMO correction filter for each offset class by means of the equation:

$$G(d_i,t,\omega) = \sum_{y'} e^{-i\omega(\tau_n/A_i - t)} \quad (16)$$

where $\tau_n^2 = (t + D'\sigma)^2 - (hD')^2$ $$D' = \frac{t d_i A_i^2}{h^2}$$

$$\sigma = \begin{cases} |y' - x_i| & \text{if } (y' - x_i) h > 0 \\ -|y' - x_i| & \text{if } (y' - x_i) h < 0 \end{cases}$$

$A_i = [1 - (d_i/h)^2]^{-\frac{1}{2}}$ and the Fourier sign convention for Equation (16) is given by $$G(d_i,t,\omega) = \sum_{y'} e^{-i\omega t'} G(d_i,t,t').$$

inverting the filter and applying the inverted filter to the dip moveout method given by the equation:

$$P_0(x_i, t) = \sum_{t'} \sum_{y} P_h(y, tA_i - t') S(d_i,t,t')$$

where $S(d_i,t,t')$ represents the inverted filter.

3. A method for producing true-amplitude seismic images which comprises:

selecting a reflectivity and dip for a theoretical dipping layer in three dimensions;

generating a synthetic dataset corresponding to reflection from the theoretical dipping layer using a known source wavelet and a conventional three dimensional scalar wave equation;

correcting the synthetic dataset for spherical divergence to provide a spherical divergence corrected synthetic dataset;

correcting the spherical divergence corrected synthetic dataset for normal moveout to provide a normal moveout corrected synthetic dataset;

correcting the normal moveout corrected synthetic dataset for dip moveout using an extra degree of freedom in the dip moveout equation to provide a corrected synthetic dataset;

performing zero-offset migration on the corrected synthetic dataset to provide a migrated seismic image;

comparing the migrated seismic image with a known true-amplitude image derived from the known reflectivity and the known source wavelet from the theoretical dipping layer;

adjusting the migrated seismic image to substantially correspond to the known true-amplitude image by adjustment of the extra degree of freedom to provide a set of correction filters;

energizing one or more seismic energy sources located in a survey area in order o generate seismic traces at one or more seismic receivers located in the survey area;

treating each seismic signal to produce a wavelet of substantially constant spectral value over a bandwidth range;

correcting each treated seismic signal for spherical divergence to provide a spherical divergence-corrected seismic signal;

correcting each spherical divergence-corrected seismic signal for normal moveout to provide a normal moveout-corrected seismic signal;

correcting each normal moveout-corrected seismic signal for dip moveout using the correction filters to provide a corrected seismic signal;

performing zero-offset migration on the corrected seismic signal.

* * * * *

UNITED STATES PATENT AND TRADEMARK OFFICE
CERTIFICATE OF CORRECTION

PATENT NO. : 4,878,204

DATED : October 31, 1989

INVENTOR(S) : James L. Black and Cameron B. Wason

It is certified that error appears in the above-identified patent and that said Letters Patent is hereby corrected as shown below:

In column 12, line 35, change "o" to --to--.

Signed and Sealed this

Twentieth Day of March, 1990

Attest:

JEFFREY M. SAMUELS

*Attesting Officer*   *Acting Commissioner of Patents and Trademarks*

UNITED STATES PATENT AND TRADEMARK OFFICE
CERTIFICATE OF CORRECTION

PATENT NO. : 4,878,204

DATED : October 31, 1989

INVENTOR(S) : James L. Black and Cameron B. Wason

It is certified that error appears in the above-identified patent and that said Letters Patent is hereby corrected as shown below:

In column 12, line 35, change "o" to --to--

Signed and Sealed this

Eighteenth Day of December, 1990

*Attest:*

HARRY F. MANBECK, JR.

*Attesting Officer*   *Commissioner of Patents and Trademarks*